(12) United States Patent
Bast

(10) Patent No.: US 7,438,024 B2
(45) Date of Patent: Oct. 21, 2008

(54) WOOD-BURNING BOILER

(76) Inventor: Robert Bast, 400 Railway Ave. East, Box 85, Brooten, MN (US) 56316

( * ) Notice: Subject to any disclaimer, the term of this patent is extended or adjusted under 35 U.S.C. 154(b) by 89 days.

(21) Appl. No.: 11/583,998

(22) Filed: Oct. 19, 2006

(65) Prior Publication Data

US 2007/0089733 A1      Apr. 26, 2007

Related U.S. Application Data

(60) Provisional application No. 60/728,531, filed on Oct. 20, 2005.

(51) Int. Cl.
*F24H 1/00* (2006.01)
(52) U.S. Cl. .................. 122/16.1; 122/20 A
(58) Field of Classification Search ............. 122/16.1, 122/20 R, 20 A; 126/513, 523, 531, 532
See application file for complete search history.

(56) References Cited

U.S. PATENT DOCUMENTS

| | | | | |
|---|---|---|---|---|
| 4,201,185 A | * | 5/1980 | Black | 126/77 |
| 4,377,153 A | * | 3/1983 | Flagg | 126/502 |
| 4,461,242 A | * | 7/1984 | Black | 122/16.1 |
| 4,700,686 A | * | 10/1987 | Woo | 126/113 |
| 4,724,798 A | * | 2/1988 | Alspaugh | 122/14.2 |
| 5,016,609 A | * | 5/1991 | Shimek et al. | 126/85 B |
| 5,165,350 A | * | 11/1992 | Leffel | 110/234 |
| 2005/0284421 A1 | * | 12/2005 | Penner et al. | 122/16.1 |

OTHER PUBLICATIONS

U.S. Appl. No. 60/728,531, filed Oct. 20, 2005, Robert Bast.
*Heating with Wood: Principals of Combustion*, by Michael Vogel, Montana State University, reprinted Mar. 2003.

* cited by examiner

*Primary Examiner*—Gregory A Wilson
(74) *Attorney, Agent, or Firm*—Patterson, Thuente, Skaar & Christensen PA

(57) ABSTRACT

A wood-burning boiler is provided, comprising a combustion chamber having a first air intake, and being adapted for holding combustible wood. An exhaust chamber is fluidly coupled to the combustion chamber, and is adapted to receive burnt gases from the combustion chamber. A preheat chamber is included, having a second air intake, and the preheat chamber is fluidly coupled to the combustion chamber and is conductively proximate to the exhaust chamber such that the burnt gases in the exhaust chamber heat the air within the preheat chamber prior to the air in the preheat chamber entering the combustion chamber. The boiler also includes a water jacket conductively proximate the combustion chamber.

17 Claims, 5 Drawing Sheets

WOOD-BURNING BOILER

The present application claims the benefit of U.S. Provisional Application No. 60/728,531, filed Oct. 20, 2005, the disclosure of which is hereby incorporated by reference in its entirety.

TECHNICAL FIELD

The present invention relates to boilers for heating water. More particularly, the present invention relates to boilers that use combustible wood as fuel.

BACKGROUND OF THE INVENTION

Wood-burning boilers are known in the industry. Typically wood-burning boilers are disposed exterior to and away from the structure to be heated. Water lines extend from the wood-burning boiler to the structure to be heated, where the heated water is circulated and the cooled return water is returned to the wood-burning boiler.

Combustion in the wood-burning boiler is typically enhanced by forcing air into the boiler in order to make the combustion process more efficient. Additionally, by denying the forced air, the boiler can be cooled between periods of heating. In this manner, the wood-burning boiler may be thermostatically controlled by a thermostat located in the structure to be heated that controls the fan for forcing air into the wood-burning boiler.

There is a need in the industry to increase the efficiency of wood-burning boilers. There are three stages of combustion of wood, which are described in *Heating with Wood: Principals of Combustion*, by Michael Vogel, Montana State University, reprinted March 2003, the disclosure of which is hereby incorporated by reference in its entirety. The first stage of wood combustion is the heating and evaporating stage, wherein water within the wood is boiled, and also, volatile gases begin to be generated. The second stage of wood combustion is the heat-producing stage, during which primary and secondary combustion takes place. Primary combustion is the process by which gases are released from wood and burned, and takes place in the range of 500 to 900 degrees Fahrenheit. Primary combustion produces large byproducts of unburned combustible gases, which contain a large amount of potential heat from the wood. In order for these gases to be burned, sufficient oxygen is needed as well as temperatures over 1100 degrees Fahrenheit, conditions which are not normally present in typical wood burning stoves. The air supply amount is critical, as too little air will not support combustion, yet too much air will cool the gaseous mixture, preventing combustion. The third stage of wood combustion is the charcoal stage, having a burn temperature exceeding 1100 degrees Fahrenheit.

Accordingly, there is a need in the industry for a wood-burning boiler that more efficiently combusts wood.

SUMMARY OF THE INVENTION

The present invention substantially meets the aforementioned needs of the industry. By providing a primary and a secondary air, with heating of the secondary air in two different stages, the boiler of the present invention provides for combustion of wood fuel throughout its stages of combustion.

In one embodiment, the present invention is a wood-burning boiler comprising a combustion chamber having a first air intake, and being adapted for holding combustible wood. An exhaust chamber is fluidly coupled to the combustion chamber, and is adapted to receive burnt gases from the combustion chamber. A preheat chamber is included, having a second air intake, and the preheat chamber is fluidly coupled to the combustion chamber and is conductively proximate to the exhaust chamber such that the burnt gases in the exhaust chamber heat the air within the preheat chamber prior to the air in the preheat chamber entering the combustion chamber. The boiler also includes a water jacket conductively proximate the combustion chamber.

In another embodiment, the present invention is a multi-stage wood-burning boiler, comprising a primary combustion stage and a secondary combustion stage. The primary combustion stage includes a combustion chamber having a primary air intake to provide air for primary combustion of a combustible wood, and an exhaust chamber fluidly coupled to the combustion chamber and adapted to receive burnt gases from the combustion chamber. The secondary combustion stage includes a preheat chamber having a secondary air intake, the preheat chamber being conductively proximate the exhaust chamber such that the burnt gases in the exhaust chamber heat the secondary air within the preheat chamber prior to the secondary air entering the combustion chamber for secondary combustion of the combustible wood. The boiler also includes a water jacket conductively proximate the combustion chamber.

In still another embodiment, the present invention is a method of heating water, comprising providing a boiler having a combustion chamber fluidly coupled to a primary air source, combusting a first stage of combustible wood fuel within the combustion chamber using air from the primary air source, providing a preheating chamber fluidly coupled to a secondary air source and conductively proximate the exhaust chamber, expelling burnt gases into the exhaust chamber, heating the secondary air within the preheat chamber by conduction from the exhaust chamber to the preheat chamber, introducing the heated secondary air into the combustion chamber, combusting a second stage of combustible wood fuel within the combustion chamber using the preheated secondary air, expelling exhaust gases out of the exhaust chamber, and providing a water jacket conductively proximate the combustion chamber thereby heating water within the water jacket.

BRIEF DESCRIPTION OF THE DRAWINGS

The present invention can be more completely understood and appreciated by referring to the following more detailed description of the presently preferred exemplary embodiments of the invention in conjunction with the accompanying drawings, of which.

DETAILED DESCRIPTION OF THE DRAWINGS

Figure 1:
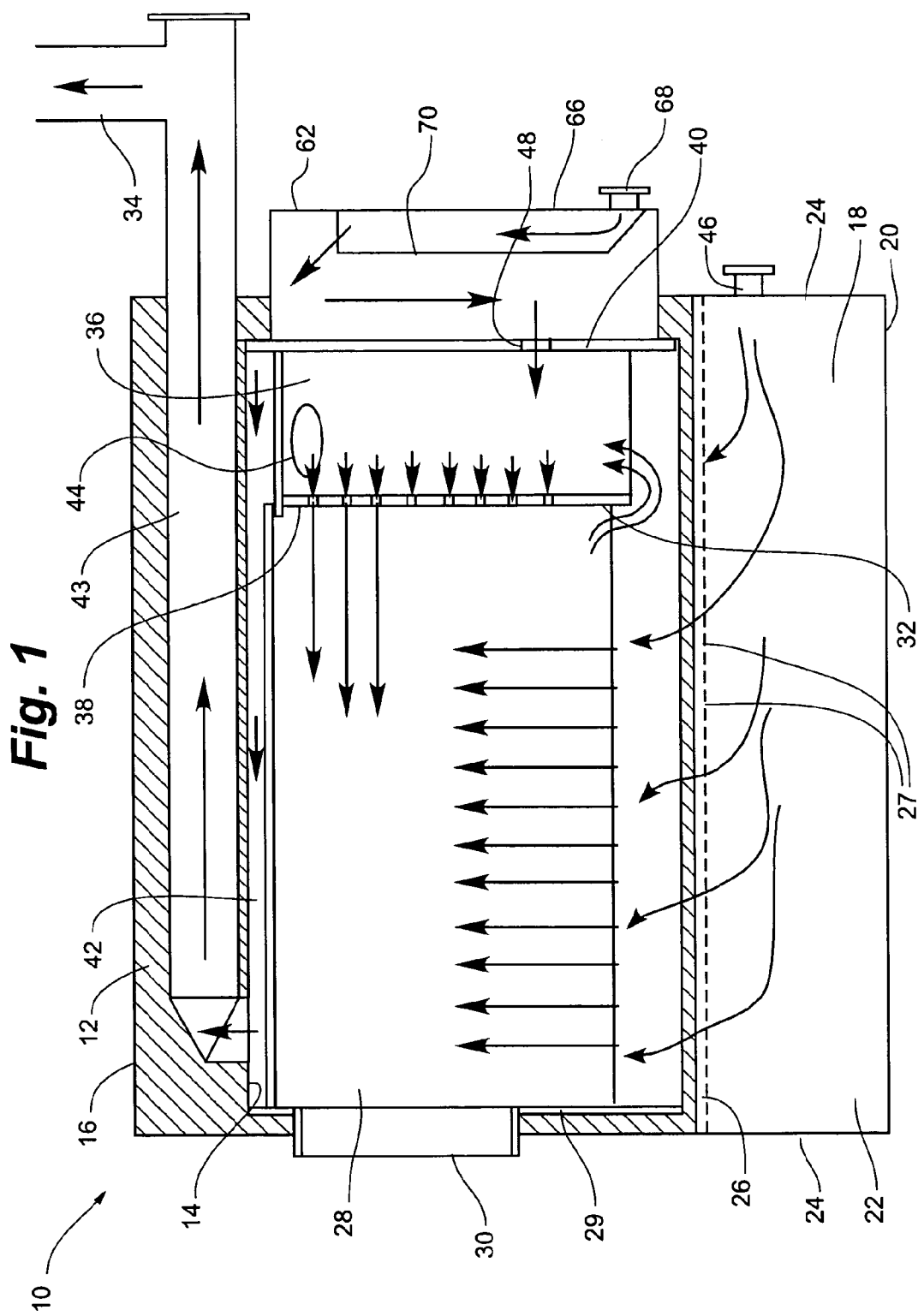
FIG. 1 is a side perspective view of the boiler of the present invention in section.
Figure 2:
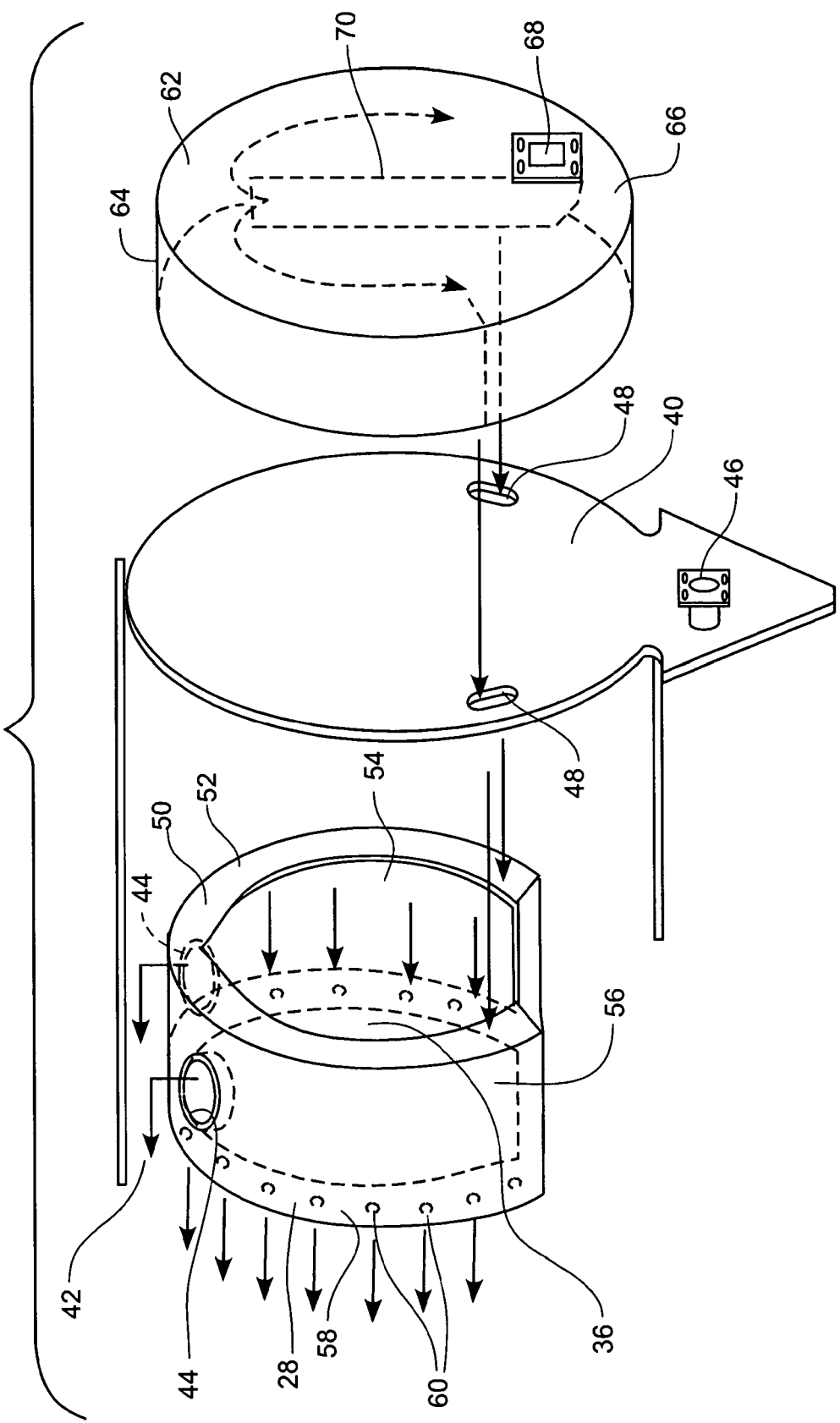
FIG. 2 is an exploded perspective view of the first and second air preheat chambers of the boiler.
Figure 3:
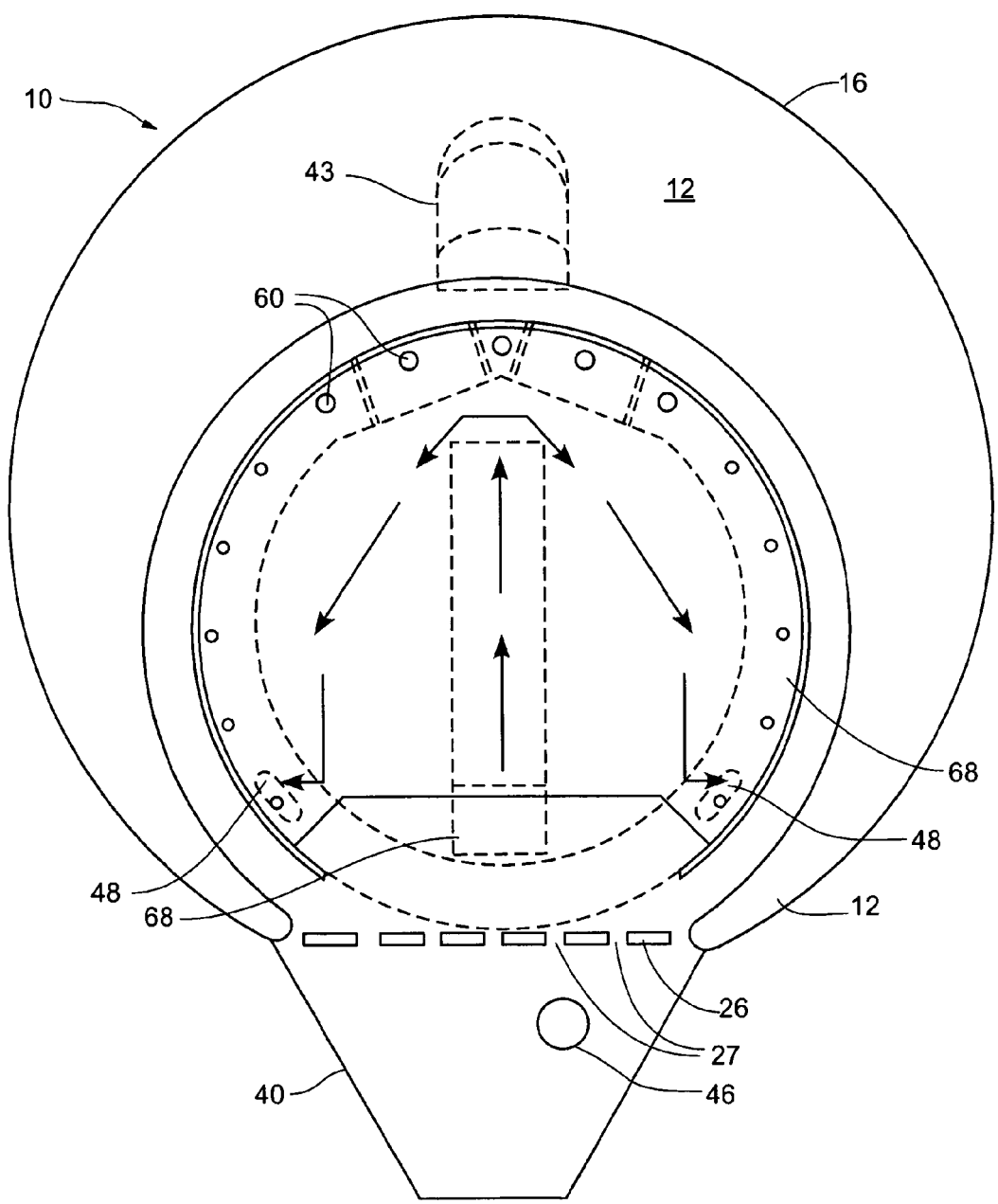
FIG. 3 is an end view of secondary air flow through the first and second air preheat chambers.

In the following detailed description of the present invention, numerous specific details are set forth in order to provide a thorough understanding of the present invention. However, it will be obvious to one skilled in the art that the present invention may be practiced without these specific details. In other instances, well-known methods, procedures, and components have not been described in detail so as to not unnecessarily obscure aspects of the present invention.

The wood-burning boiler of the present invention is shown generally at 10 in the figures. The wood-burning boiler 10 has five major subcomponents: water jacket 12, ash pan 18, fire chamber 28, second air preheat chamber 50 and first air preheat chamber 62.

The water jacket 12 of the wood-burning boiler 10 is shaped to conform to the profile of fire chamber 28, and in one embodiment water jacket 12 is arc- or circular-shaped, having an inner wall 14 and a spaced apart outer wall 16, and closed on its ends. Water to be heated flows between the inner wall 14 and the outer wall 16. The water jacket 12 wraps around at least a portion of fire chamber 28 such that heat is conducted from fire chamber 28 into water jacket 12. In one embodiment, water jacket 12 terminates at its lower margin above the ash pan 18.

The ash pan 18 of wood-burning boiler 10 is generally box shaped having a bottom 20, a pair of spaced apart sides 22, and a pair of spaced apart ends 24. The upper margin of the ash pan 18 is defined by a plurality of grates 26 that include a plurality of slots 27 defined therein. The slots 27 are constructed such that ash may pass downward through the slots 27 and air may pass upward through the slots 27. The grates 26 form the bottom margin of the fire chamber 28. Ash pan 18 is located below, and in fluid communication with, fire chamber 28. Ash pan 18 may slide out from boiler 10 to facilitate removal of ashes.

Figure 4:
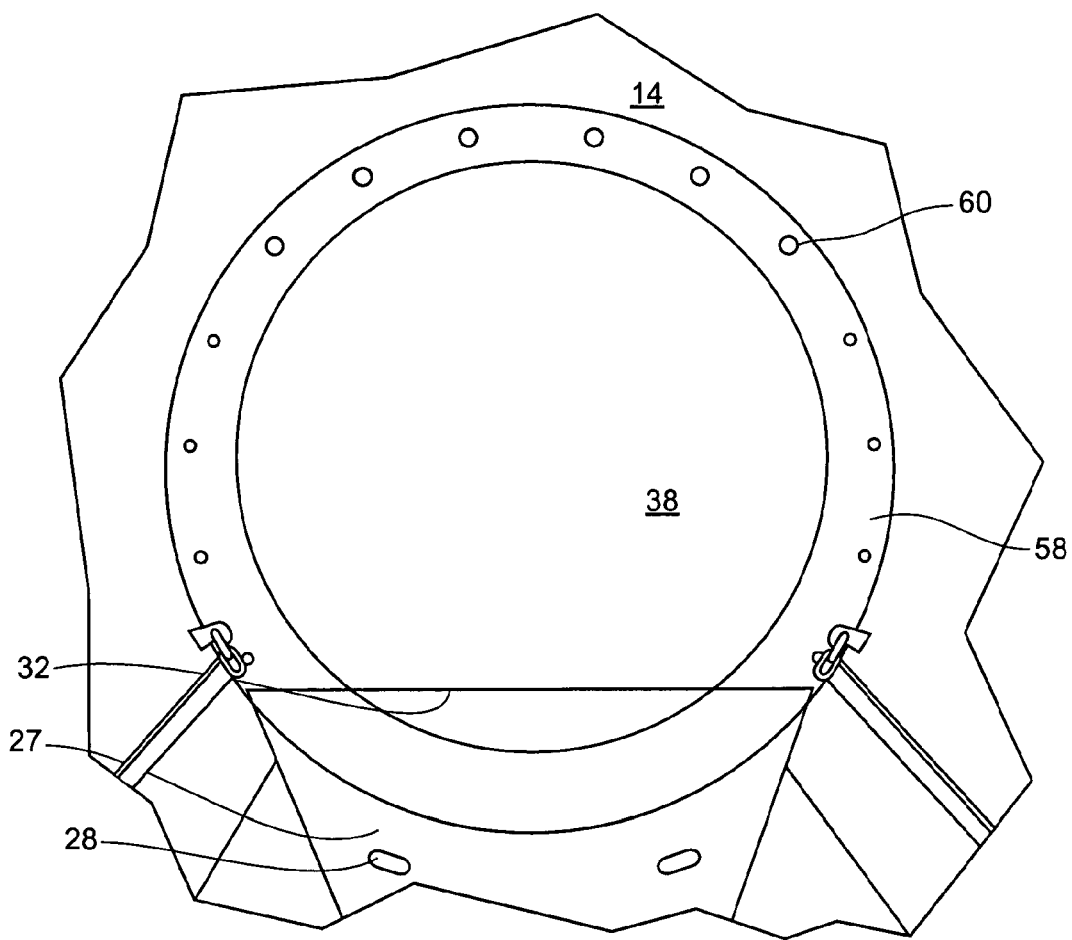
FIG. 4 is a close-up depiction of the rear of the first chamber of the boiler.
Figure 5:
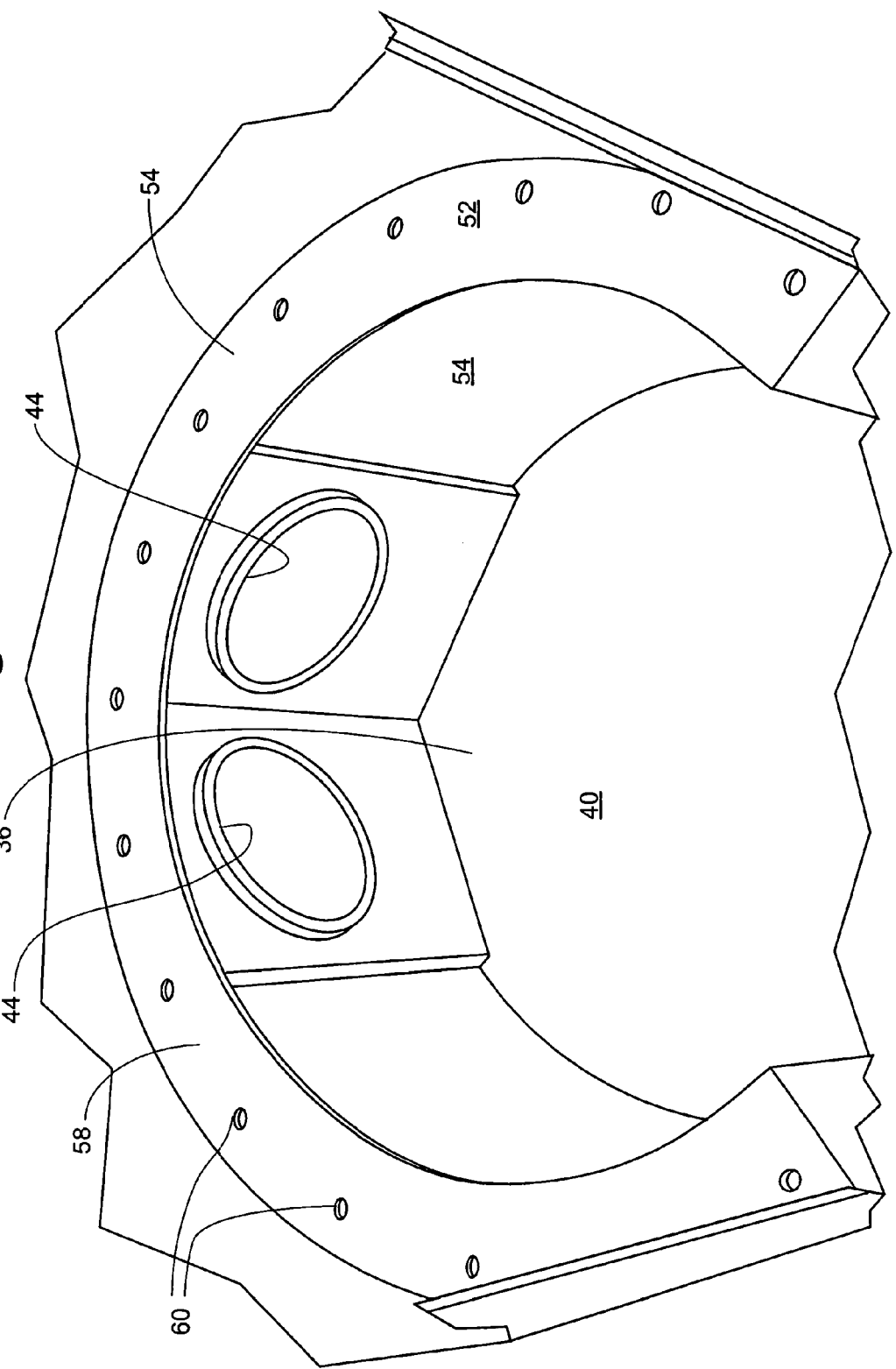
FIG. 5 is a close-up depiction of the second air preheat chamber taken from the fire chamber.

The fire chamber 28, or combustion chamber, of the wood-burning boiler 10 is generally cylindrical in shape being defined in part by the inner wall 14, a front wall 29, and a fire chamber rear plate 38. A loading door 30 for loading of wood fuel into the fire chamber 28 is defined in the front wall 29. An exhaust opening 32, as depicted in FIG. 4, is defined beneath the rear margin of the fire chamber rear plate 38. The exhaust opening 32 leads into an exhaust chamber 36 disposed rearward of the first chamber 28. Combusted gases are directed out of combustion chamber 28, through exhaust opening 32, and into exhaust chamber 36. In an embodiment wherein fire chamber 28 is generally cylindrical, water jacket 12 is in conductive contact with at least 50% of the surface of fire chamber 28. In a further embodiment, water jacket 12 may be in conductive contact with at least 66% of the surface of fire chamber 28. In a still further embodiment, water jacket 12 may be in conductive contact with at least 75% of the surface of fire chamber 28.

The exhaust chamber 36 is defined in part by the inner wall 14, the rear margin of the fire chamber rear plate 38, and a rear plate 40. A pair of exhaust outlets 44 are defined proximate the upper margin of the exhaust chamber 36. The exhaust outlets 44 are fluidly coupled to a first exhaust passage 42 that extends through the water jacket 12 to provide additional heating of the water in the water jacket 12. The exhaust then travels into a second passage 43, which may also extend through water jacket 12 to provide additional heating of water in the water jacket 12. Second passageway 43 is coupled to an exhaust stack 34 for discharge of exhaust from the wood-burning boiler 10.

A primary air inlet 46 is defined in the lower portion of the rear plate 40. The primary air inlet 46 is in fluid communication with a fan (not shown) and communicates forced air into the ash pan 18. Primary air inlet 46 provides primary fresh air to combustion chamber 28 to combust wood therein. Primary air inlet 46 may also be located elsewhere, such as directly on ash pan 18.

A secondary air inlet 68 is provided on a first air preheat chamber 62. A pair of secondary air ports 48 are defined in the rear plate 40. The secondary air ports 48 are in fluid communication with the second air preheat chamber 50, and facilitate flow of secondary air from first air preheat chamber 62 into second air preheat chamber 50.

The second air preheat chamber 50 of the wood-burning boiler 10 defines a horseshoe-shaped collar 52 that is annular to and substantially surrounds the exhaust chamber 36. The collar 52 has an inner wall 54, a spaced apart outer wall 56, a rear wall that is defined by the forward margin of the rear plate 40, and a front plate 58. The front plate 58 has a plurality of forward directed air holes 60 defined therein, the holes 60 facilitating flow of secondary air into combustion chamber 28. Second air preheat chamber 50 is conductively proximate to at least a portion of exhaust chamber 36, wherein conductively proximate describes a relationship between two or more components that are located close enough to one another to facilitate heat transfer by conduction between the components.

The first air preheat chamber 62 of the wood-burning boiler 10 is defined by a cylindrical wall 64. The cylindrical wall 64 is capped at the forward end by the rear margin of the rear plate 40 and is capped at rearward end by the back plate 66. A secondary air inlet 68 is defined in the back plate 66. A baffle 70 is disposed in the first air preheat chamber 62. In the embodiments depicted generally in the figures, rear plate 40 comprises a wall between exhaust chamber 36 and first air preheat chamber 62.

Preferably, the major components of boiler 10 are constructed from steel, although other conductive materials may be used. Welding is a preferred method of joining together components, such as second air preheat chamber 50 to rear plate 40, and first air preheat chamber 62 to rear plate 40.

In operation, a fan forces primary air into the primary air inlet 46. The primary air floods the ash pan 18 and is forced upward through the slots 27 defined in the grates 26 to enter the fire chamber 28. The primary air assists in the combustion of wood fuel disposed in the fire chamber 28.

Burnt gases in the fire chamber 28 pass downward through the exhaust opening 32 and upward in the exhaust chamber 36. While temporarily contained within exhaust chamber 36, the burnt gases conductively heat the air within second air preheat chamber 50 to approximately 1,100 to 1,600 degrees Fahrenheit. The burnt gases then pass out of outlets 44 and into exhaust passage 42 which underlies or passes through water jacket 12. Burnt gases then travel through the exhaust passage 43 that passes through the water jacket 12 to be exhausted through the exhaust stack 34.

Secondary air is introduced into the wood-burning boiler 10 through the secondary air inlet 68. The secondary air passes upward between the baffle 70 and the back plate 66 of first air preheat chamber 62. The secondary air then passes downward between the baffle 70 and the rear plate 40. Hot burnt gases temporarily contained within exhaust chamber 36 conductively heat the rear plate 40 to a relatively high temperature, such that secondary air passing through the first air preheat chamber 62 is elevated to a temperature of approximately 500 degrees Fahrenheit. The heated secondary air then passes through the two air ports 48 and into the second air preheat chamber 50. As noted above, the high temperature burnt gases passing through the exhaust chamber 36 from combustion chamber 28 heat the secondary air in the second air preheat chamber 50 by conduction to between 1,100 and 1,600 degrees Fahrenheit. Such heated air in second air preheat chamber 50 is then passed through the forward directed air hole 60 into the fire chamber 28 to aid in combustion. The introduction of secondary, preheated air into combustion chamber 28 increases the efficiency of combustion of the wood in chamber 28 by utilizing the additional stages of combustion as discussed in the background section. The water within water jacket 12 is heated by conduction from combustion chamber 28. Water is circulated through water jacket 12, with unheated water introduced to water jacket 12 and heated water circulated out of water jacket 12.

The above disclosure is not intended as limiting. Those skilled in the art will readily observe that numerous modifications and alterations of the device may be made while retaining the teachings of the invention. For example, although various components of boiler 10 are described as cylindrical or circular in shape, other shapes are within the spirit and scope of the present invention. Additionally, boiler 10 is depicted as having a first preheat chamber 62 and a second preheat chamber 50, boiler 10 may comprise only one preheating chamber, or more than two preheat chambers. Accordingly, the above disclosure should be construed as limited only by the restrictions of the appended claims.

What is claimed is:

1. A wood-burning boiler, comprising:
   a combustion chamber having a first air intake and adapted for holding combustible wood;
   an exhaust chamber fluidly coupled to the combustion chamber and adapted to receive burnt gases from the combustion chamber;
   a preheat chamber having a second air intake, the preheat chamber fluidly coupled to the combustion chamber and conductively proximate the exhaust chamber such that the burnt gases in the exhaust chamber heat the air within the preheat chamber prior to the air in the preheat chamber entering the combustion chamber;
   a second preheat chamber conductively proximate the exhaust chamber; and
   a water jacket conductively proximate the combustion chamber.

2. The wood-burning boiler of claim 1, wherein the second preheat chamber is fluidly coupled between the preheat chamber and the combustion chamber, the second preheat chamber adapted to allow heated secondary air to enter the combustion chamber.

3. The wood-burning boiler of claim 1, further comprising an exhaust passageway conductively proximate to at least a portion of the water jacket.

4. The wood-burning boiler of claim 1, further comprising an ash pan coupled between the first air intake and the combustion chamber, such that primary air enters the combustion chamber through the ash pan.

5. The wood-burning boiler of claim 1, wherein the water jacket is in conductive contact with at least 50% of the surface of the combustion chamber.

6. A multi-stage wood-burning boiler, comprising:
   a primary combustion stage, including:
      a combustion chamber having a primary air intake to provide air for primary combustion of a combustible wood; and
      an exhaust chamber fluidly coupled to the combustion chamber and adapted to receive burnt gases from the combustion chamber;
   a secondary combustion stage including:
      a preheat chamber having a secondary air intake, the preheat chamber being conductively proximate the exhaust chamber such that the burnt gases in the exhaust chamber heat the secondary air within the preheat chamber prior to the secondary air entering the combustion chamber for secondary combustion of the combustible wood;
      a second preheat chamber conductively proximate the exhaust chamber; and
   a water jacket conductively proximate the combustion chamber.

7. The multi-stage wood-burning boiler of claim 6, wherein the second preheat chamber is fluidly coupled between the preheat chamber and the combustion chamber, the second preheat chamber adapted to allow heated secondary air to enter the combustion chamber.

8. The multi-stage wood-burning boiler of claim 6, further comprising an exhaust passageway conductively proximate to at least a portion of the water jacket.

9. The multi-stage wood-burning boiler of claim 6, wherein the water jacket is in conductive contact with at least 50% of the surface of the combustion chamber.

10. The multi-stage wood-burning boiler of claim 6, further comprising an ash pan coupled between the primary air intake and the combustion chamber, such that primary air enters the combustion chamber through the ash pan.

11. A method of heating water, comprising:
   providing a boiler having a combustion chamber fluidly coupled to a primary air source;
   combusting a first stage of combustible wood fuel within the combustion chamber using air from the primary air source;
   providing a preheating chamber fluidly coupled to a secondary air source and conductively proximate the exhaust chamber;
   expelling burnt gases into the exhaust chamber;
   heating the secondary air within the preheat chamber by conduction from the exhaust chamber to the preheat chamber;
   introducing the heated secondary air into the combustion chamber;
   combusting a second stage of combustible wood fuel within the combustion chamber using the preheated secondary air;
   expelling exhaust gases out of the exhaust chamber;
   a second preheat chamber conductively proximate the exhaust chamber; and
   providing a water jacket conductively proximate the combustion chamber, thereby heating water within the water jacket.

12. The method of claim 11, further comprising coupling an exhaust passage to the exhaust chamber and adapting the exhaust passage to discharge gases from the boiler.

13. The method of claim 12, including disposing the exhaust passage conductively proximate to at least a portion of the water jacket.

14. The method of claim 11, including fluidly coupling the second preheat chamber between the preheat chamber and the combustion chamber, the second preheat chamber adapted to allow heated secondary air to enter the combustion chamber.

15. The method of claim 11, including coupling an ash pan coupled between the primary air source and the combustion chamber, such that primary air enters the combustion chamber through the ash pan.

16. The method of claim 11, further comprising circulating water through the water jacket.

17. The method of claim 11, including heating the secondary air within the preheat chamber by conduction from the exhaust chamber to the preheat chamber to at least 1100 degrees Fahrenheit.

* * * * *